US00RE39524E

(19) United States
(12) Reissued Patent
McIntyre et al.

(10) Patent Number: US RE39,524 E
(45) Date of Reissued Patent: Mar. 20, 2007

(54) HYBRID CAMERA SYSTEM WITH ELECTRONIC ALBUM CONTROL

(75) Inventors: Dale F. McIntyre, Rochester, NY (US); Dana W. Wolcott, Rochester, NY (US)

(73) Assignee: Eastman Kodak Company, Rochester, NY (US)

(21) Appl. No.: 09/927,036

(22) Filed: Aug. 9, 2001

Related U.S. Patent Documents

Reissue of:
(64) Patent No.: 5,940,121
Issued: Aug. 17, 1999
Appl. No.: 08/803,548
Filed: Feb. 20, 1997

(51) Int. Cl.
*H04N 1/00* (2006.01)
*H04N 1/32* (2006.01)
*G03B 17/18* (2006.01)
*G03B 17/48* (2006.01)

(52) U.S. Cl. ..... 348/64; 348/207.99; 375/240.01
(58) Field of Classification Search ..... 348/64, 348/207, 373, 213, 232, 429; *H04N 7/18*
See application file for complete search history.

(56) References Cited

U.S. PATENT DOCUMENTS 4,716,470 A * 12/1987 Levine ..... 358/400
4,742,369 A * 5/1988 Ishii et al. ..... 396/213
4,804,983 A * 2/1989 Thayer, Jr. ..... 396/2
4,827,347 A * 5/1989 Bell ..... 348/333.05
4,949,117 A * 8/1990 Van Heyningen et al. .. 396/100
5,023,635 A * 6/1991 Nealon ..... 396/311
5,023,650 A * 6/1991 Hoshino et al. ..... 396/213
5,164,751 A * 11/1992 Weyer ..... 396/430
5,229,810 A * 7/1993 Cloutier et al. ..... 355/40
5,274,418 A * 12/1993 Kazami et al. ..... 355/40
5,331,419 A * 7/1994 Yamada et al. ..... 348/64
5,389,984 A * 2/1995 Lovenheim ..... 396/429
5,450,149 A * 9/1995 Cocca ..... 396/320
5,561,458 A * 10/1996 Cronin et al. ..... 348/64
5,581,299 A * 12/1996 Raney ..... 348/64
5,619,257 A * 4/1997 Reele et al. ..... 348/64
5,678,102 A * 10/1997 Chamberlain, IV ..... 396/429
5,687,412 A * 11/1997 McIntyre ..... 396/319

FOREIGN PATENT DOCUMENTS

JP SHO 59-214023 12/1984
JP HEI 01-281441 11/1989
JP HEI 09-005871 1/1997
JP HEI 09-043717 2/1997
JP HEI 10-161232 6/1998

* cited by examiner

*Primary Examiner*—Nhon Diep
(74) *Attorney, Agent, or Firm*—David A. Novais

(57) ABSTRACT

A hybrid camera includes a pair of imaging systems for capturing images on contained photographic film and an electronic imager, respectively, the film having a magnetic layer. An exterior imaging display allows the user to review the captured image and an input device allows the user to selectively input album related data onto the magnetic layer of the film. The album-related data allows the photo finisher to automatically produce the images in an album-like format. The camera also allows annotated text corresponding to the image to be selectively added to an album print.

18 Claims, 8 Drawing Sheets

HYBRID CAMERA SYSTEM WITH ELECTRONIC ALBUM CONTROL

Matter enclosed in heavy brackets [ ] appears in the original patent but forms no part of this reissue specification; matter printed in italics indicates the additions made by reissue.

*This application is a reissue application for U.S. Pat. No. 5,940,121 issued Aug. 17, 1999 on U.S. Ser. No. 08/803,548 filed Feb. 20, 1997.*

FIELD OF THE INVENTION

This invention relates to hybrid camera systems capable of capturing both electronic and photographic film images, and more particularly to a hybrid camera system, method and apparatus for selectively reviewing and creating album formats for film images captured by the camera.

BACKGROUND OF THE INVENTION

Hybrid cameras that concurrently capture both photographic film and electronic images of a scene are shown in U.S. Pat. No. 4,716,470, which describes a hybrid camera containing systems for capturing respective images onto a photographic film and an electronic imaging element, such as an area array of charge coupled devices (CCD). The camera has an optical system, in combination with a shutter release mechanism, allowing a still image to be captured by the photographic film and the electronic imaging element, either sequentially using a single optical system or essentially simultaneously using parallel optical systems.

Hybrid cameras also may include a display, usually a liquid crystal display (LCD) provided in the rear of the camera which allows the user to either review or preview the image. The user then may opt to process the captured photographic image based on the still electronic image, or in the review mode, the user may alternately decide not to process the reviewed image as captured on the photographic film. Such a hybrid camera is described in U.S. Pat. No. 4,742,369 in which the user is given an option as to whether to preview a selection after electronic image capture or review after the photographic and electronic images have been captured. In other examples of the prior art, instructions can be given as to whether exposure control, illumination, etc., should be augmented based on the still image, therefore providing guidance to the photo finisher. In commonly assigned U.S. Pat. No. 4,949,117, an image verifier camera is described in which the electronic sensor is used to control the recording of the image onto photographic film. The user is allowed to select those frames captured by the camera which are to be processed and printed by use of the electronic display. Additionally, these cameras can also record data relating to how the selected frame(s) are to be printed; that is, information relating to cropping, zoom, and exposure. Each of the above examples are indeed useful for previewing an electronic image to determine whether a silver halide (conventional photographic) image of interest should be taken, or alternately, if the image has already been taken, whether or not instructions should be given to the photo finisher to modify processing or providing cropping, enlargement, etc.

A more recent development in the photographic field, commonly referred to as the Advanced Photographic System (APS), includes cameras sold under the trademark Advantix, by the Eastman Kodak Company. These camera utilize a photographic filmstrip having a transparent magnetic layer including plural longitudinal magnetic tracks on the border of the filmstrip which begin and end within individual frames. Each magnetic track is dedicated to the reading and writing of data in a predetermined format, the data relating to the corresponding frame, for easy access by a user or photo finisher. Each user has the capability to read and/or write information in self-identifying data in the corresponding tracks. An example of this format is contained in U.S. Pat. No. 5,229,810, which hereby is incorporated by reference as part of the disclosure of the present invention. The use of the magnetic tracks has found a number of useful applications, particularly relating to the photoprocessing field. For further information on cameras having magnetic tracks, see U.S. Pat. No. 5,023,635, which describes a camera having a dual capture system which includes a video monitor which is used in writing photo finishing instructions onto the magnetic track of the film.

Schemes have been proposed for magnetically recording on the photographic film information useful in organizing photographs in an album. For example, information recorded may represent a series of album pages which have been preselected by a previewer and within onto the magnetic layer of the film, thereby allowing the user to select both the image and the desired page as well as the position of the print on the page of interest. However, the recording is made upon processing and is placed on the film upon return of the photographic order from the film processor. One of these album organization schemes is disclosed in U.S. Pat. No. 5,274,418, which describes optically encoding information onto a filmstrip for orienting an array of processed images onto an album page. This patent, however, does not describe a camera having an electronic display or viewfinder to review prints to orient the captured images for presentation within an album format.

The creation of a meaningful album of photographs is also enhanced by a system embodying the invention which enables combination of textual information, such as screen-related data or other information, in addition to date stamping, with the photographic prints selected for album formatting in order to provide text on the same album pages as the prints of a processed order.

SUMMARY OF THE INVENTION

A primary object of the present invention is to provide an improved system which increases the capability of hybrid cameras.

Another primary object of the present invention is to provide an improved hybrid camera system which allows a user to select images captured using a hybrid camera and determining a specific page and orientation onto which a selected image will be produced in an album-like format.

Another primary object of the present invention is to provide an improved hybrid camera system which allows a user to select a particular image in a particular order for composing the album pages which can be composed automatically by the photo processor.

A further object of the present invention is to provide an improved hybrid camera having the ability to magnetically record text annotation via voice recognition, keyboard, or other input means and to transfer the information so that the processor can create an album where the annotation is combined with the prints.

Briefly described, a hybrid camera system embodying the invention has image capture means, such as an electronic sensor and an optical and film transport mechanism, which simultaneously capture an optical image onto a photographic film and corresponding electronic image on the electronic sensor within a camera housing.

A display means can display the image captured electronically by the image capture means. In order to facilitate organization of prints made from the film into an album, input means are operated by the user while observing the electronic image to selectively input album related instructions relating to the image displayed. The instructions can provide information or relate to the orientation and formatting of the prints in an album or album-like format.

In a preferred embodiment, the film has a magnetic recording media and the user selections are recorded directly onto the magnetic media allowing the selections to be read by photoprocessing apparatus capable of digitally reproducing the film images selected in the selected order and automatically composing the album pages to comprise the photographing order.

The invention also provides a method for selectively captured images in an album-like format using a hybrid camera having a display for displaying a captured image. In carrying out the method an image is simultaneously captured onto a photographic film and electronic imager or sensor contained with the camera. The film has a magnetic media for receiving information thereon. The captured image is then displayed. Thereafter, album related data is selectively inputted onto the magnetic media of film corresponding to the displayed image.

An advantage of the present invention is to provide for automatic creation of an album which satisfies the need to organize photographs without the necessity of two separate events, a first picture taking event and a later album making event. An album making event can become burdensome because the specific details of the picture taking event have become lost over time, the camera system of the present invention on the other hand, allows for capturing an image, previewing the image in an album format, supplying orientation and other formatting instructions for encoding onto the magnetic track, and selectively providing text annotation corresponding to the previewed image.

Another advantage of the present invention is that all of the proceeding steps can be done by the user and at the camera level, as opposed to having some of the steps performed at the photo finisher level. Another advantage of the present invention is that customization of images captured by the camera (i.e. orientation, fonts used, etc.) in an album-like format can be done at the time of the picture taking event using the camera and by writing directly onto the film. The photographs can then be produced at a later date by the photo finisher without further intervention of the photographer required Other objects, features, and advantages will be apparent from the following Detailed Description of the Invention, when read in conjunction with the accompanying drawings.

DETAILED DESCRIPTION OF THE INVENTION

This invention is now described in relation to a preferred embodiment using a specific non-single lens reflex (NSLR) hybrid camera. It will be apparent from the following discussion, however, that the teachings of the present invention can extend to SLRs, as well as other known cameras, including digital cameras, which can also be adapted in a similar fashion.

Figure 1:
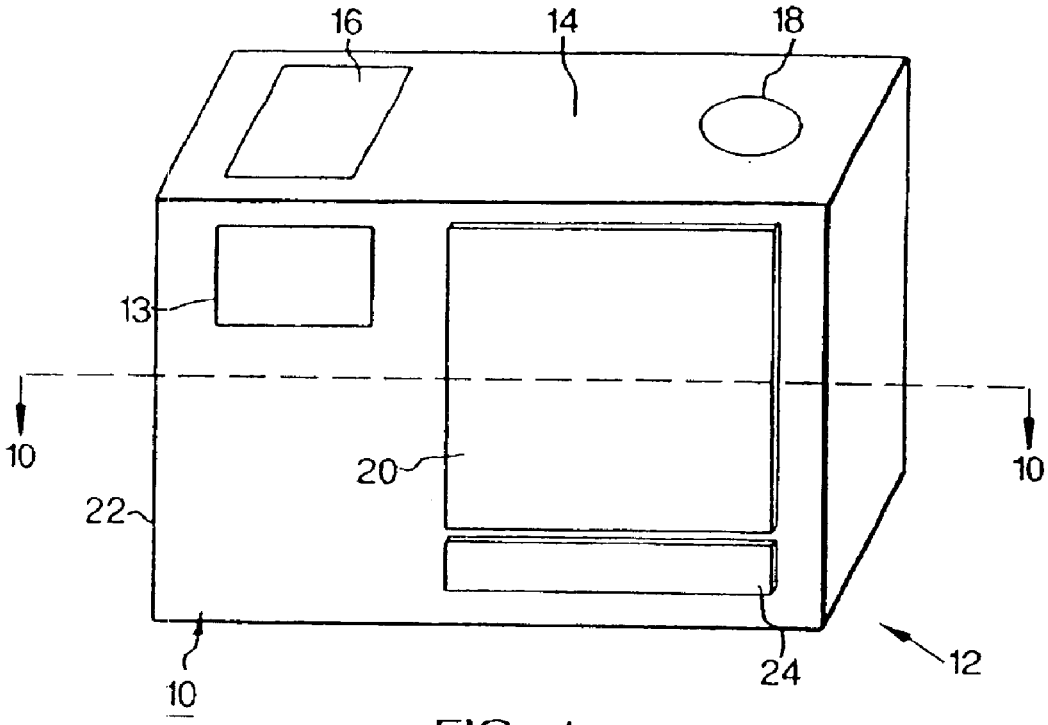
FIG. 1 is a rear view of a camera according to a preferred embodiment of the present invention.
Figure 2:
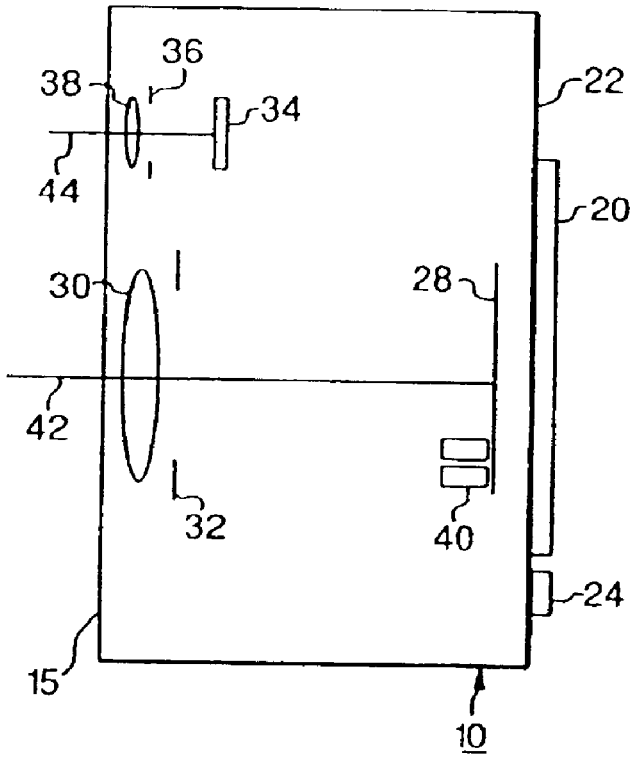
FIG. 2 is a diagrammatic side view of the camera of FIG. 1 illustrating dual image capture paths.

FIGS. 1 and 2 show a non-single-lens-reflex camera 10 which includes a rectangular camera housing or body 12 having an optical viewfinder 13. The optical viewfinder 13 includes a through opening in the body 12 and windows on the front and rear sides 15,22 respectively and is used by the photographer for composing a scene to be recorded on a photographic medium contained within the camera 10, as is commonly known. A liquid crystal information display (LCD) 16 is provided on a top surface 14 of the camera body 12, along with a depressible shutter release button 18. The liquid crystal display 16 is used to present information as the operator exercises the various functions of the camera 10. For purposes of this embodiment, the functions displayed by the information display 16 do not relate to the present invention. Messages may be present on the LCD 16 as pictograms and/or actual text. In either case, this data comes from the internal memory of the camera where it has been recorded, such as prior to the delivery of the camera. Messages may be presented in the display 16 relating to loading of the film cartridge, the type of cartridge loaded, the status of the cartridge, lighting conditions, etc. The depressible shutter release button 18 is used for actuating a shutter mechanism, allowing image capture as described in greater detail below.

According to this embodiment, a pair of electronic displays 20,24 which do pertain to the present invention are adjacently provided on the rear side 22 of the camera body 12. The first electronic display 20 is a flat color liquid crystal display (LCD) screen, such as Model LQ3GN31, manufactured by Sharp Electronics, Inc., preferably capable of presenting high resolution color images. The second adjacent electronic display 24 according to this embodiment is a black and white single liquid crystal display (LCD) 24 capable of displaying single line text. As described below, each of the imaging the textual displays 20,24 also present specific information as the operator exercises specific functions of the camera 10. The details regarding the workings and details of LCDs in general are already commonly known in the field and do not form an essential part of the present invention. Therefore, further discussion is not required, except as needed.

Figure 10:
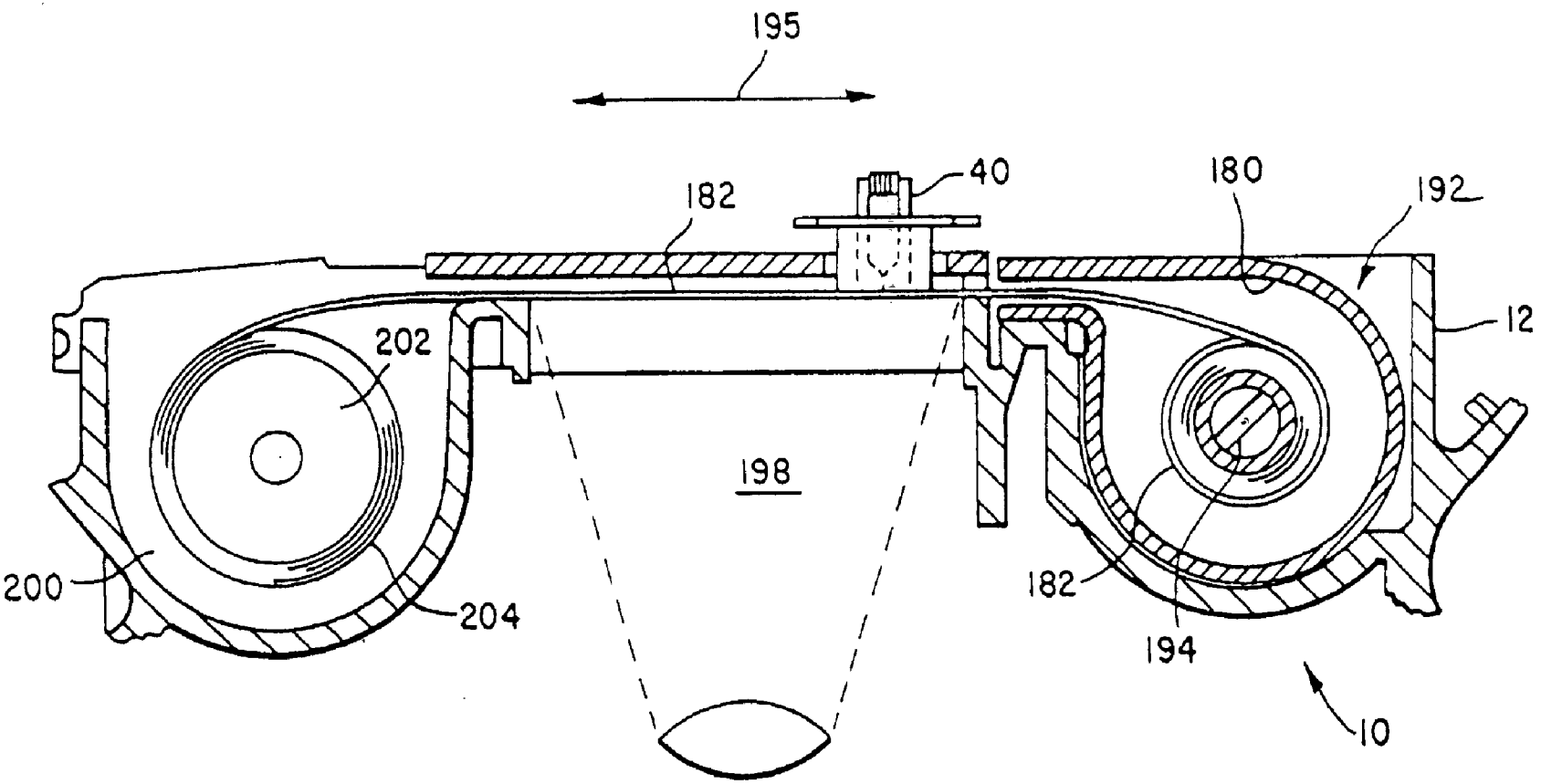
FIG. 10 is a partial sectional view of the camera of FIG. 1, taken through line 10—10.
Figure 11:
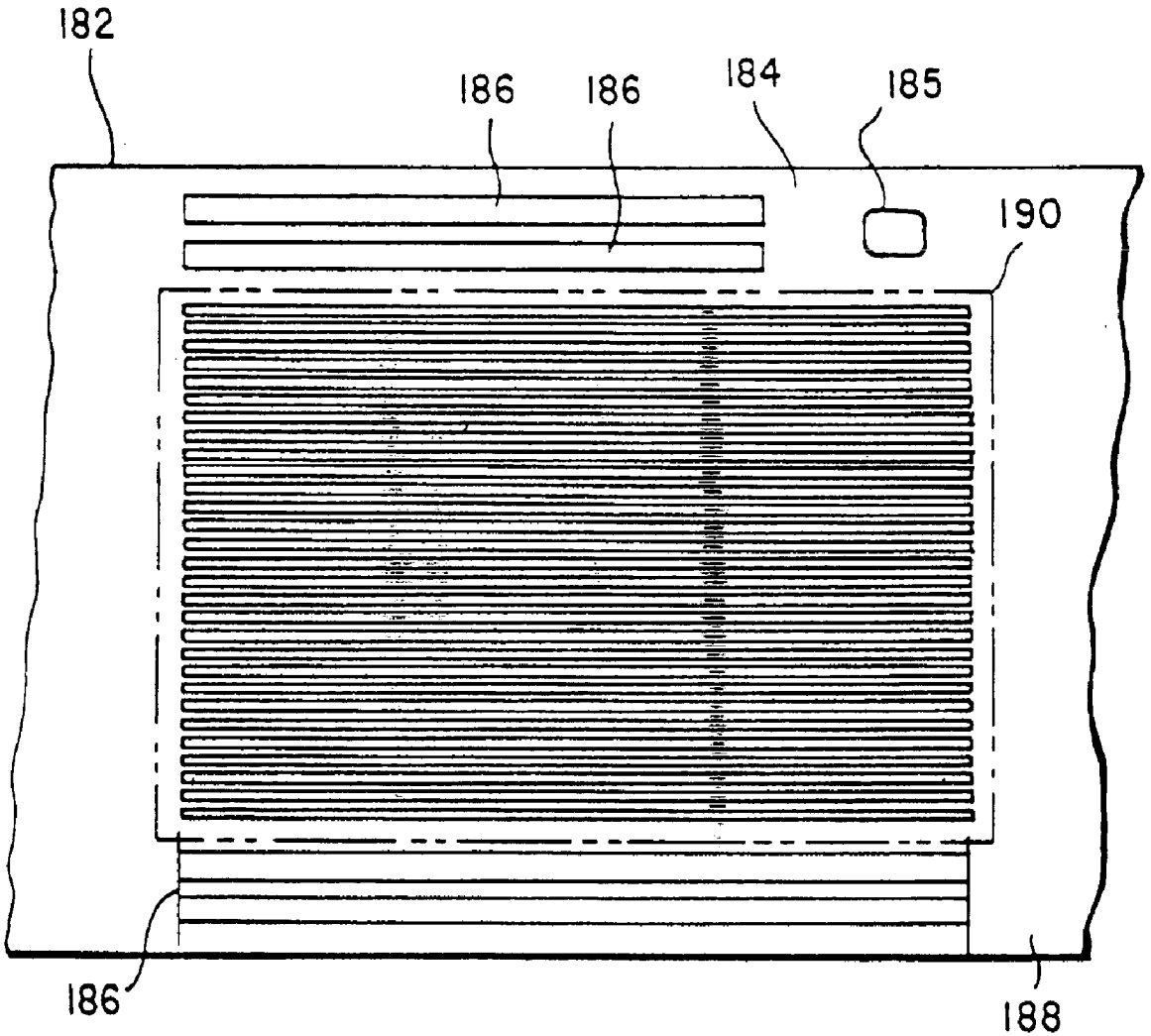
FIG. 11 is a partial top view of the magnetic layer of a photographic filmstrip used in accordance with the present invention.

Referring to FIGS. 10 and 11, the camera 10 is designed to be used with a film cartridge 180 containing a photographic filmstrip 182 which includes a virtually transparent magnetic recording layer 184 having a series of longitudinal parallel tracks 186 along the adjacent edges 188 of a film frame 190. A perforation 185 separates adjacent frames 190 of the filmstrip 182. As shown, the magnetic tracks 186 are located outside the photographic capture area of the filmstrip 182. Additional details relating to the magnetic layer 184 and parallel tracks 186 are disclosed in U.S. Pat. No. 5,229,810, which hereby is incorporated by reference into the disclosure of the present invention.

For purposes of background, the film cartridge 180, which is received in a cartridge receiving chamber 192 of the camera body 12, includes a light-lock door (not shown) which is movable between a closed position, sealing the cartridge in a light-tight fashion, and an open position for allowing the filmstrip 182 to exit the cartridge through the light-lock door. Once the door is opened, the filmstrip 182 is thrust from the confines of the cartridge by rotation within the cartridge 180 of a spool 194 around which the filmstrip has been wound. The filmstrip 182 is then thrust along a film travel path, shown as arrow 195 and stopped across an exposure gate 198 which allows ambient light to impinge on a frame 190 of the photographic film. After exposure, the film is advanced to an oppositely disposed film roll chamber 200 having a take-up spool 202 onto which the exposed film 204 is wound. When all frames have been exposed, a film rewind mechanism (not shown) rewinds the exposed film 204 from the take-up spool 202 back onto the confines of the film cartridge 180, as is conventionally known. The workings themselves of the so-called "thrust-type" cartridges, as well as those of the film advance and take-up mechanisms are commonly known in the prior art and do not form a basis for the present invention.

Referring to FIGS. 2, 10 and 11, a magnetic head 40 is fixedly disposed along the film travel path 195 in a location adjacent one of the longitudinal magnetic tracks 186 of the passing filmstrip 182. The magnetic head 40 is capable of recording information to one of the magnetic tracks 186 based on specific data input by the camera user, as described in greater detail below. As more clearly illustrated in FIG. 2, camera 10 includes dual film and electronic image capture systems. A length of the photographic filmstrip 182 corresponding to a track 186 is advanced from the film cartridge 180, and into the exposure gate 198, of the camera body 12. Upon depression of the shutter release button 18, ambient light is passed through an objective imaging lens 30 which focuses the light through a shutter aperture 32 along an optical axis 42 into the exposure gate 198, FIG. 10, and onto a film plane 28, in a manner commonly known in the field.

Similarly, a solid-state imaging element or imagery 34, such as a charge coupled device (CCD), is adjacently and fixedly positioned by known means within the interior of the camera body 12 to receive an optical image as focused by a separate focusing lens 38 through a shutter aperture 36 along a parallel optical axis 44. According to this embodiment, and as described below, each of the shutter apertures 32, 36 are opened essentially simultaneously by the depression of the shutter release button 18.

The specific positioning of the electronic imager 34 and the workings of the shuttering mechanism (not shown) are not necessarily critical to the workings of the present invention, provided the dual optical systems are configured and aligned to capture essentially the same scene as viewed through the optical viewfinder 13. A similar system is described in commonly assigned U.S. Pat. No. 4,949,117, which is hereby incorporated by reference into the disclosure of the present invention. In addition, it is also contemplated for purposes of the present invention that a single optical path can be utilized in lieu of using a pair of optical systems by using a beamsplitter or other similar device. Such an arrangement is described in U.S. Pat. No. 4,716,470 which is hereby incorporated by reference into the disclosure of the present invention. Other salient features of the present camera 10 will now be described.

Figure 5:
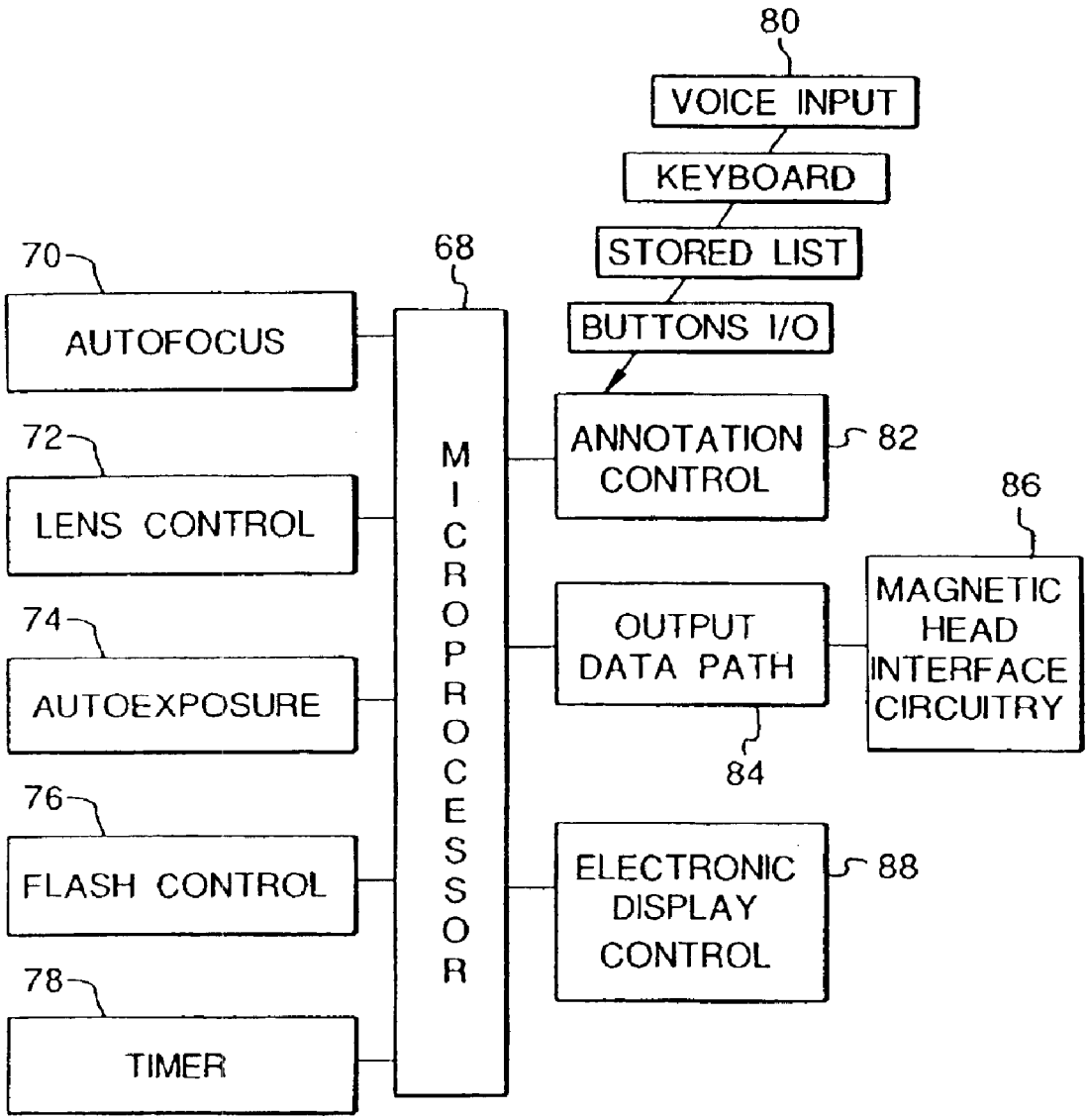
FIG. 5 is a control block diagram of the camera of FIGS. 1–4.

Referring to the block diagram of FIG. 5, hybrid camera 10 includes a contained microprocessor 68; for example, an 8-bit or 16-bit microprocessor such as Model MC68HC11, manufactured by Motorola Corporation, having sufficient logic for interconnecting each of the operational components or control blocks, including an autofocus block 70, a lens control block 72, an autoexposure block 74, a flash control block 76, and a timer block 78, respectively, shown herein for completeness. Additional details relating to each of the above control blocks are found in U.S. Pat. No. 4,949,117. Otherwise, for purposes of the present invention, no further discussion is supplied herein, except as needed.

Still referring to FIG. 5, and particularly to the present invention, the microprocessor 68 also controls each of the imaging and textual displays 20, 24 through an electronic display control block 88. In addition, an annotation control block 82 supplies text input through the back and white display 24 via an annotation input path 80 which loads the text information for writing onto the magnetic layer 184 of the filmstrip 182, FIG. 11, and more specifically to a magnetic track 186 through an output data path 84 to the electrical interface circuitry block 86 controlling the magnetic head 40, FIG. 2.

Figure 9:
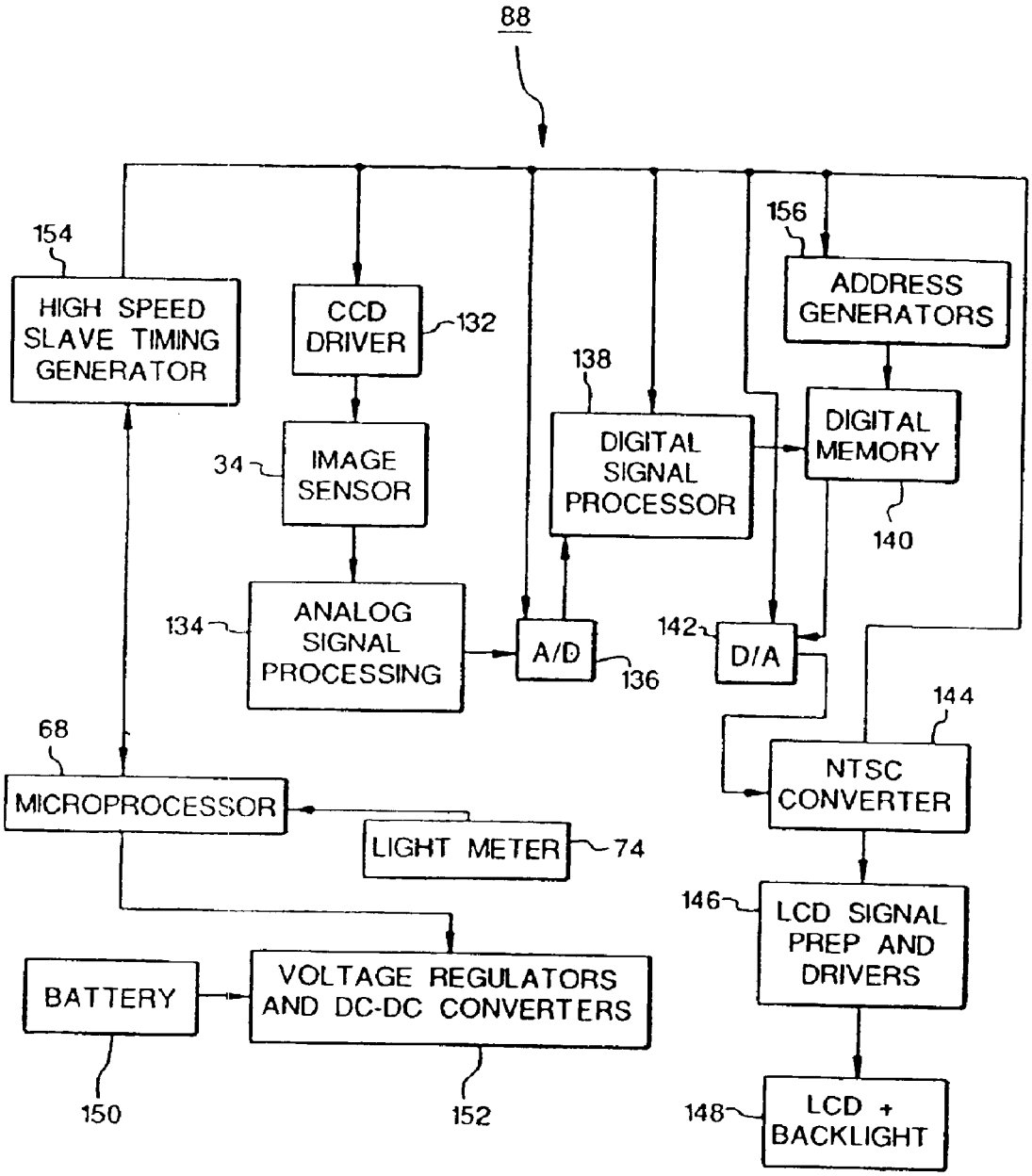
FIG. 9 is a block diagram of the interface between the electronic display and the electronic imager of the described embodiment.

An example of a useful electronic display control block 88 pertaining to the imaging display 20 is illustrated in FIG. 9. As is known in the field, an electronic liquid crystal display requires a video signal input, as opposed to computer LCDs which typically recognize digital signal input. Therefore, CCD driver circuitry 132 allows an electronic image to be captured by the photodiodes (not shown) of the image sensor 34, having appropriate analog signal processing circuitry and amplifying circuitry 134. A corresponding analog signal is converted to a digital signal by an analog-to-digital converter 136 and processed by a digital signal processor 138 prior to storage in a digital memory 140 using address generators 156. Additional conversion of the digital signal by a digital-to-analog converter 142 and NTSC converter 144 allows an NTSC video signal to be transmitted through signal conditioning electronics 146 for display by the LCD 20, preferably having a powered backlight 148 as is commonly known. A battery 150 powers microprocessor 68 via a voltage regulating block 152, the microprocessor also being interconnected to a high speed slave timing generator 154. Additional details relating to the processing of the image signal are commonly known in the field, such as described in U.S. Pat. No. 4,949,117.

Figure 3A:
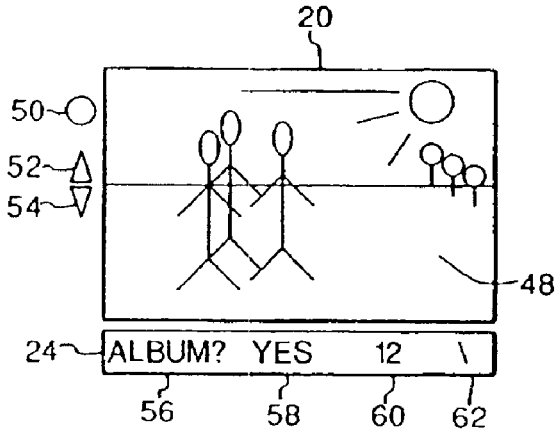
FIG. 3(a) is a diagrammatic view of the rear of the camera of FIGS. 1 and 2, including electronic imaging and text displays and controls.
Figure 3B:
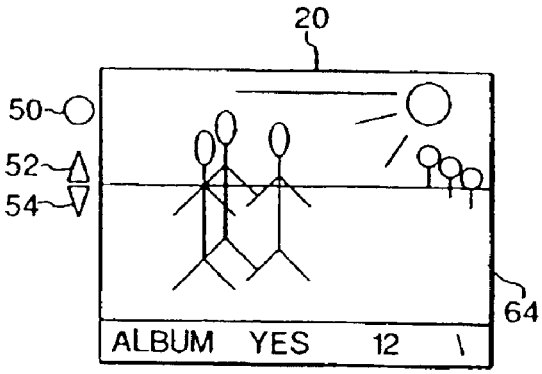
FIG. 3(b) is an alternate display for use with the camera of FIGS. 1 and 2.

Referring to FIG. 3(a), and according to this particular embodiment, a series of control switches 50,52,54 are provided on the rear side 22 of the camera body 12 preferably adjacent the flat imaging and textual displays 20, 24, for controlling each of the display and input functions of the camera 10. Upon the simultaneous image capture onto the electronic imager 34, and the photographic film 182, and electronically captured scene 48, much the same as that seen through the optical viewfinder 13, is displayed on the color imaging display 20. The user, as described in greater detail momentarily, reviews the displayed image 48 and selectively determines whether or not the image should be printed as a part of an album page, as well as the specific features and format of the selected images as prints on the album page. This is accomplished by responding to a series of text prompts through feedback supplied through the text display 24. Confirmation of a selection is done by depression of a selection control button 50, while respective increment and decrement buttons 52 and 54 are used to scroll through a scripted menu of choices (partially shown) which is visible in the text detailed 24. Referring briefly to FIG. 3(b), it will become apparent to those of ordinary skill in the field that a single composite display 64 may be alternately utilized in lieu of the pair of dual imaging and textual displays 20,24. Such a composite display would allow text annotation information to be added to the displayed electronic image of interest.

Figure 6:
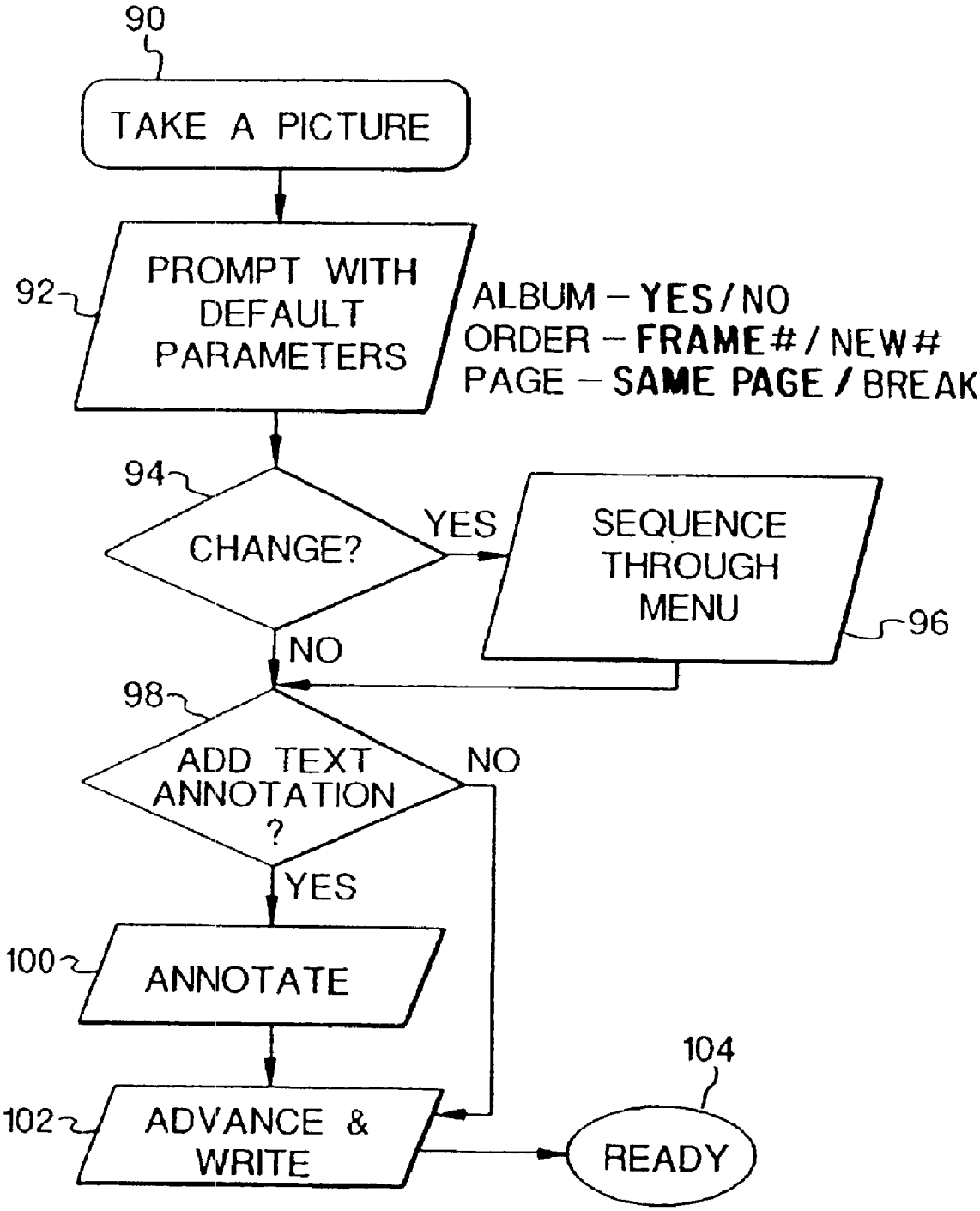
FIG. 6 is a flow chart of the logic used to select and process album decisions and annotation using the camera of FIGS. 1–5.

FIG. 6 illustrates a typical operational logic flow for camera 10. As initially described, an image capture forms the first step 90 of the operation. An optical image of a scene of interest is first viewed through the optical viewfinder 13, representative of the image perceived by each of the imaging lenses 30,38. Depression of the shutter release button 18 causes simultaneous image capture by the photographic filmstrip 182 and the electronic imager 34 by opening of respective shutter apertures 32,36, in a commonly known manner. Automatically, the capture of the image on the electronic imager 34 enables the electronic display control block 88, as described above with reference to FIG. 9, to transmit a digitized version of the captured image onto the imaging display 20.

Initially, a corresponding user prompt message is transmitted by the microprocessor 68 through similar circuitry to the textual display 24, as shown more clearly in FIG. 3(a). The series of default prompts is relate to the automatic album making function as displayed by the textual display 24 in a series of discrete fields. According to this embodiment, the initial display includes a query field 56, a query response field 58, an image sequence number 60 and a page break field 62, respectively, sequentially disposed across the single line text display 24. According to the present embodiment, the initial default parameters which are displayed by display 24 indicate to the user that the displayed image will be placed in an album. In addition, the corresponding frame number of the filmstrip 182 is assigned as the album order number with no defined page breaks as in each of the respectively displayed fields.

According to step 94 of FIG. 6, the user may elect to alter the present default parameters by depressing the control button 50 until the query response field 58 is flashing. For example, if the user does not desire to place a displayed image in an album, then depression of either of the scroll buttons 52, 54 increments the query response to NO. This election is confirmed by subsequent depression of the control button 50. Non-election of the automatic album feature shifts the software to step 104 and the filmstrip 182 is readied for subsequent advance.

Figure 8:
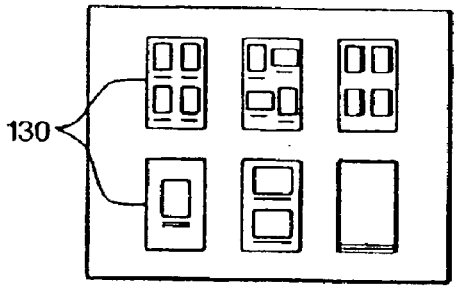
FIG. 8 is a display selection of possible album page layouts showing different orientations and sizes for selection by a user.

If the automatic album feature is selected, and according to step 96, the scrolling buttons 52,54 allow movement through a menu of available choices relating to the orientation and format of the displayed prints on album pages. These buttons can be used to prompt a set of alternate menu choices, as programmed into the logic of the microprocessor 68 in a commonly known manner. A convenient menu logic for the textual information according to this embodiment is a series of choices which are conveyed similarly to those used in a Microsoft Windows environment. One specific example of a formatting option is illustrated in FIG. 8, used for selecting the format of an album page. Depending on the memory available in the microprocessor 68, this option allows an operator to visually see several selected imagettes on a number of album pages 130. In each case, an album related selection is stored in the volatile memory (not shown) of the microprocessor 68 after confirmation by depression of the control button 50. By scrolling in either menu direction, album format, orientation and page selections can be modified prior to adding of text annotation.

According to step 98, and after all of the album input parameters have been selected for a displayed image by the user according to the menu, depression of the control button 50 will trigger the microprocessor 68 to engage the annotation feature and the user will be initially prompted for input.

It should be noted that a number of different means for inputting appropriate text information can be utilized. For example, U.S. Pat. No. 4,742,369 describes a voice recognition system for a camera that can be modified to provide the necessary input. Alternately, the 4,742,369 patent also describes an alphanumeric keypad which can be used in conjunction with the present invention according to the annotation input path 80 shown in FIG. 5. Cameras such as the Ricoh RZ-105 also include a keypad inputting feature. The specific input device is not critical to the present invention; therefore, other similar devices can be used.

Figure 4:
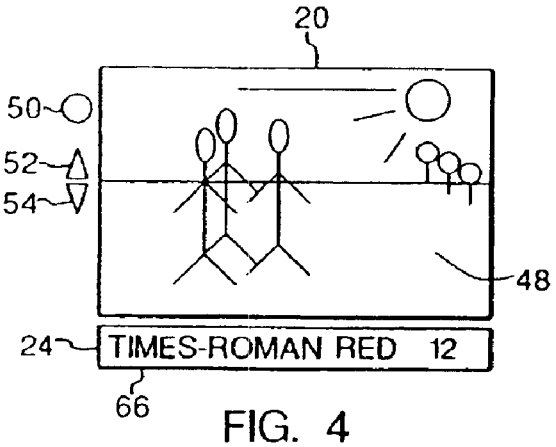
FIG. 4 is a diagrammatic view showing other input features as displayed in the text display of FIG. 3(A)

An initial text display 24 is depicted in FIG. 4. As shown, and depending on the logic contained in the microprocessor 68, a variety of menu options are available. Accoridng to the present embodiment, the font style and size of the annotated text information that the photo finisher will use on the selected album pages can be preselected in a font control field 66 by the user and written onto the magnetic layer 184, FIG. 11, of the filmstrip 182, FIG. 11. As in the album formatting and orientation steps, scroll buttons 52, 54 can be used to prompt a set of alternate menu choices, as programmed into the logic of the microprocessor 68 in a commonly known manner for confirmation by depression of the control button 50. As noted above, a convenient menu logic for the textual information according to this embodiment is a series of choices which are similar to those used in a Microsoft Windows environment. Still referring to FIG. 4, the text LCD display 24 is also an advantageous way of displaying the results of annotation input for caption text used on the album page corresponding to the selected image, also by election of the user by depression of the button 50 using electronic display control block 88, in a manner previously described.

According to step 100, the input annotation data is then written onto the magnetic tracks 186 of the contained photographic filmstrip 182 using output data path 84 and the interface magnetic head circuitry 86 of FIG. 5. A preferable scheme is contained in commonly assigned U.S. Pat. No. 5,450,149 which is hereby incorporated by reference into the disclosure of the present invention.

According to step 102, and if no textual information was written onto the filmstrip 182, or if annotation is completed, then the filmstrip can be advanced using the film advance mechanism (not shown), the features of which are commonly known in the field. Alternately, if no annotation was selected, or if the automatic album feature was not selected, then the film can be advanced.

According to step 104, and once the filmstrip has been advanced to the next frame, the LCD information display indicates the camera 10 is ready for another imaging sequence and steps 90–104 are repeated. Depending on the amount of memory available to the microprocessor 68, the user can repeatedly scroll through the displayed images stored in memory prior to unloading the film cartridge 180 from the camera body 12. For example, the microprocessor 68 can be programmed to store all captured images, whether or not album related data has been correspondingly written onto the film 182.

Figure 7A:
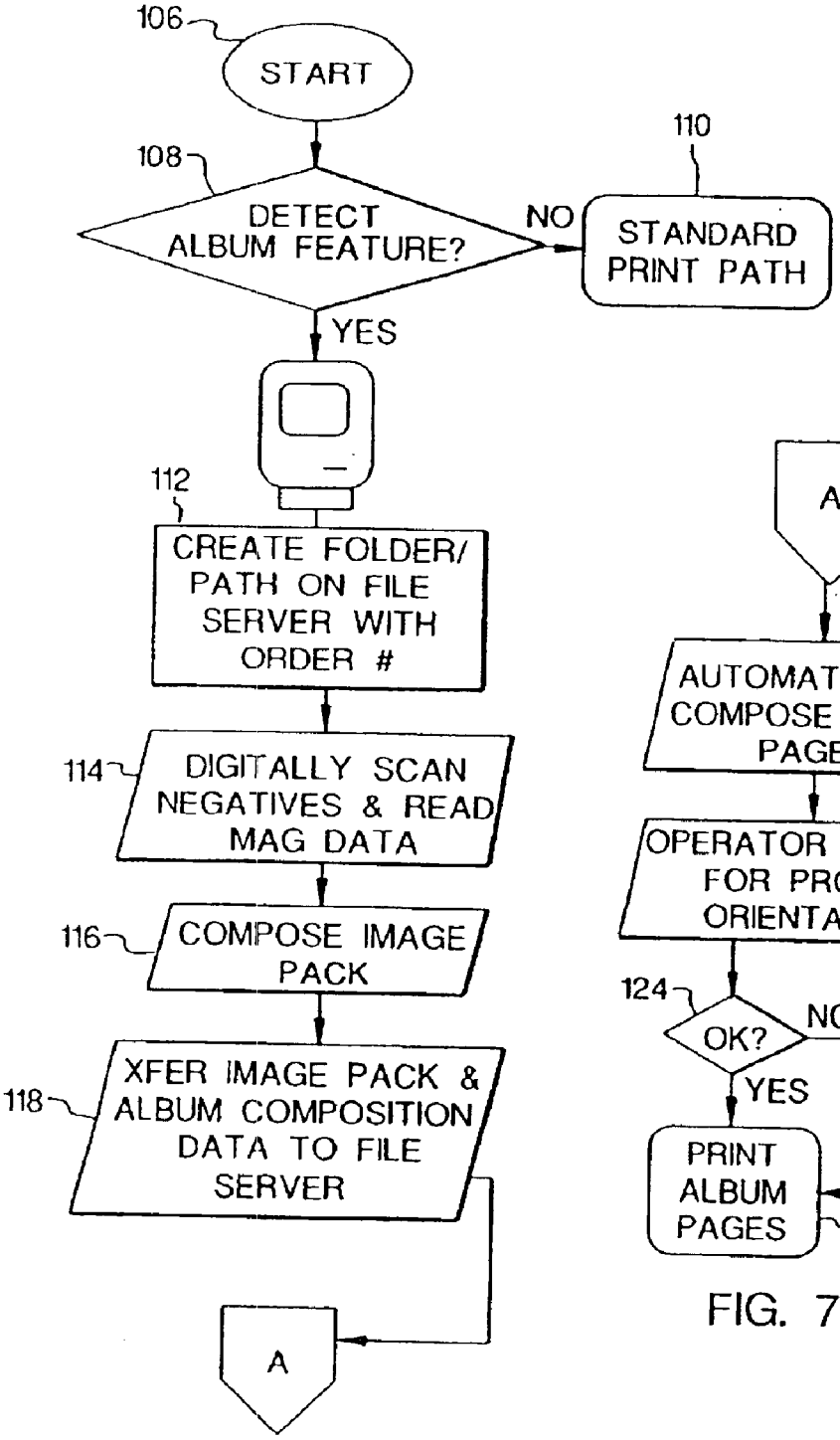
FIGS. 7(a) and 7(b) are flow charts of the photoprocessing logic used with the camera of FIGS. 1–6 for calling out and printing orders selected and for processing album decisions and annotation.
Figure 7B:
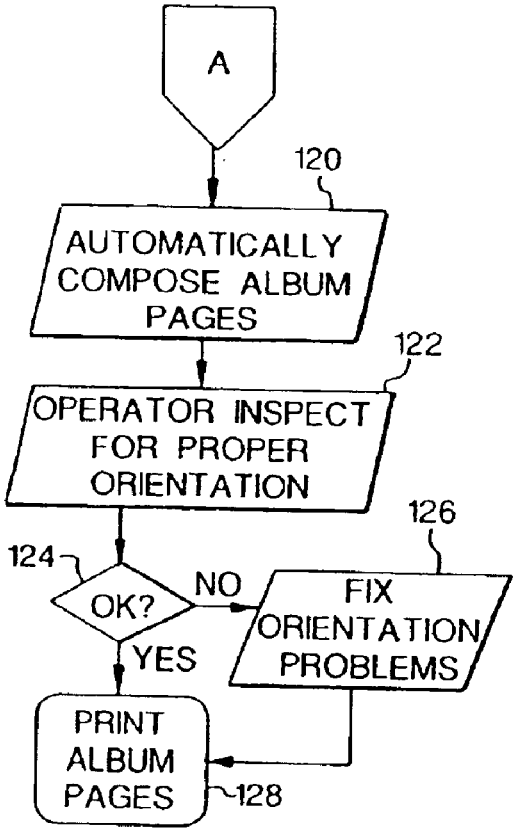

FIGS. 7(a) and 7(b) depict flow diagrams of the logic used by the microprocessor 68 to automatically print the album pages during the photofinishing process. After the photographic film 204 has been rewound into the confines of the film cartridge 180, and removed from the camera body 12, the film cartridge is delivered to a photo processor. A high resolution scanner (not shown) is preferably used to scan the negatives. Prior to or during the scanning process, the designated magnetic tracks 186 of the exposed film 204 are read by the photofinishing apparatus (not shown) to determine if the automatic album feature is present. According to step 110, and if the automatic album feature is not present on the magnetic layer 184 of the exposed photographic film 204, then standard photofinishing will occur. According to step 112, and if the automatic album feature is detected, then photofinishing apparatus, (not shown) connected to a computer network (not shown), creates a folder/path on an attached file server. The images, annotated text, and attached album directions are then digitally scanned according to step 114. According to step 116 and after the images have been scanned, the photofinishing apparatus creates an Image Pack for albuming and according to step 118 transfers it along with the album composition data to the newly created folder on the file server. According to step 120, a workstation (not shown) also attached to the file server executes software that takes the image pack along with the album composition data to display on the workstation's video display terminal (VDT) (not shown). According to step 122, the workstation operator then inspects the pages and corrects for any orientation problems per step 124. If any orientation problems are present, then they are fixed according to step 126. Otherwise, finished album pages are printed when the soft-display VDT looks appropriate.

While the invention has been described with reference to a preferred embodiment, it will be appreciated that various modifications can be made without departing from the spirit and scope of the invention. Such modifications are intended to fall within the scope of the appended claims.

We claim:

1. A hybrid camera system for effecting creation and organization of an album of photographic prints, comprising:

a camera housing;

image capture means for simultaneously capturing at least one optical image onto a photographic film and an electronic imager, each disposed within said camera housing;

display means for displaying at least one image captured by said image capture means; and input means for selectively inputting album page related instructions, relating to said at least one image displayed by said display means, said instructions relating to the orientation and formatting, including sequencing and number of images to appear on prints of album pages made upon processing said film.

2. The camera system as recited in claim 1, wherein said photographic film includes a transparent magnetic layer having at least one magnetic track capable of receiving digital information, said input means including a magnetic head having means for writing said album-related instructions onto said at least one magnetic track.

3. The camera system as recited in claim 1, including a microprocessor having sufficient memory for storing at least one electronic image captured by said image capture means, and scroll means for selectively displaying said at least one captured image retained in memory by said microprocessor.

4. The camera system as recited in claim 3, wherein said microprocessor includes a plurality of listed options pertaining to the orientation and formatting of a displayed image in the album-like format, said options being presented by said display means, wherein said camera includes switching means for selectively choosing and enabling said options.

5. The camera system as recited in claim 1, wherein said display means includes verification means for displaying said album-related instructions as input by said input means.

6. The camera system as recited in claim 1, wherein said display means includes at least one liquid crystal display.

7. The camera system as recited in claim 6, wherein said display means includes a first and a second electronic display wherein said first display displays at least one captured image and said second display displays text information relating to the albuming of said image.

8. A method for selectively capturing images in an album-like format using a hybrid camera system including a hybrid camera having display means for displaying a captured image, comprising the steps of:

i) simultaneously capturing an image onto a photographic film and electronic imager contained within said camera, said photographic film having a magnetic layer including at least one track sized for receiving information thereon;

ii) displaying said captured image on said display means; and iii) selectively inputting album page related data onto the magnetic layer of film contained within said camera, said album page related data including instructions relating to the orientation and formatting, including the sequence and number of images to appear on prints of album pages made upon processing said film.

9. A method as recited in claim 8, including the further steps of:

iv) unloading said photographic film from said camera; and v) processing said exposed film, including arranging and orienting said prints according to said inputted data.

10. A method as recited in claim 8, wherein said selectively inputting step includes selectively adding alphanumeric data to a selected displayed image to be arranged in an album-like format; and said processing steps includes printing said textual information relating to said image in the album format.

*11. A camera system for effecting creation and organization of an album of photographic prints, comprising:*

*a camera housing;*

*image capture means for capturing at least one optical image onto an electronic imager, disposed within said camera housing;*

*display means for displaying at least one image captured by said image capture means; and*

*input means for selectively inputting album page related instructions, relating to said at least one image displayed by said display means, said instructions relating to orientation and formatting, including sequencing*

*and number of images to appear on prints of album pages made using said at least one image.*

*12. The camera system as recited in claim 11, including a microprocessor having sufficient memory for storing at least one electronic image captured by said image capture means, and scroll means for selectively displaying said at least one captured image retained in memory by said microprocessor.*

*13. The camera system as recited in claim 12, wherein said microprocessor includes a plurality of listed options pertaining to the orientation and formatting of a displayed image in the album-like format, said options being presented by said display means, wherein said camera includes switching means for selectively choosing and enabling said options.*

*14. The camera system as recited in claim 11, wherein said display means includes verification means for displaying said album-related instructions as input by said input means.*

*15. The camera system as recited in claim 11, wherein said display means includes at least one liquid crystal display.*

*16. The camera system as recited in claim 15, wherein said display means includes a first and a second electronic display wherein said first display displays at least one captured image and said second display displays text information relating to the albuming of said image.*

*17. A camera system for effecting creation and organization of an album of photographic prints, comprising:*

*a camera housing;*

*an electronic imager which captures at least one optical image, disposed within said camera housing;*

*a display which displays at least one image captured by said electronic imager; and*

*control buttons for selectively inputing album page related instructions, relating to said at least one image displayed by said display, said instructions relating to orientation and formatting, including sequencing and number of images to appear on prints of album pages made using said at least one image.*

*18. A method for selectively capturing images in an album-like format using a camera having a display for displaying a captured image, comprising the steps of:*

*i) capturing an image onto an electronic imager contained within said camera;*

*ii) displaying said captured image on said display; and*

*iii) selectively inputting album page related data, said album page related data including instructions relating to orientation and formatting, including a sequence and number of images to appear on prints of album pages made using said captured image.*

* * * * *